United States Patent Office 3,266,399
Patented August 16, 1966

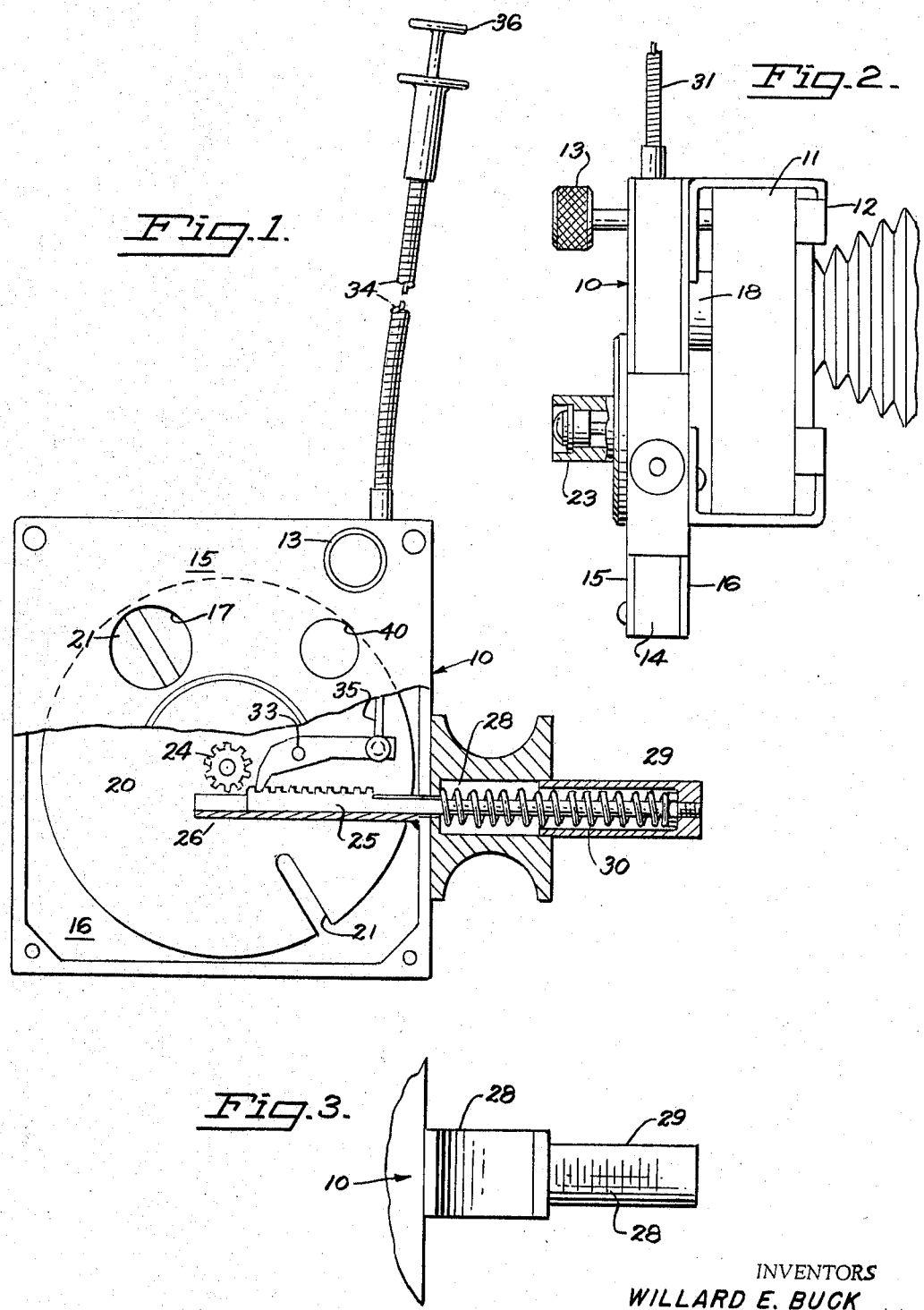

3,266,399
MULTIPLE EXPOSURE CAMERA SHUTTER
Willard E. Buck, Santa Clara, and Thomas E. Holland, Sunnyvale, Calif., assignors to Beckman & Whitley, Inc., San Carlos, Calif., a corporation of Delaware
Filed July 14, 1964, Ser. No. 382,544
2 Claims. (Cl. 95—53)

This invention relates to a shutter for a camera to enable multiple exposures of a single event on the film in the camera. It is common practice to create a record comprising multiple images or exposures of an object in motion on a single film. Studies of speed, direction and other phenomena are made from such records. One known way of producing such multiple exposure is to illuminate the event to be recorded intermittently as with a stroboscopic light. Stroboscopic equiment of this type capable of producing sufficient light to create satisfactory records is, however, so costly as to make its use economically impractical for many purposes.

It is an object of the present invention to provide a simple low cost mechanical light shuttering mechanism for attachment to a conventional camera for making multiple exposure records therewith.

Another object is to provide a multiple exposure shutter mechanism with a simple driving mechanism capable of operation at different speeds.

A further object is to provide such a mechanism utilizing a light sensor of the camera with which it is used to control total exposure time.

Further and more specific objects and advantages of the invention and the manner in which it is carried into practice are made apparent in the following specification wherein reference is made to the accompanying drawings.

In the drawings:
FIG. 1 is a view in front elevation with parts in section and parts broken away of a multiple exposure shutter embodying the present invention;
FIG. 2 is a view in end elevation of the same shutter shown in end elevation; and
FIG. 3 is a fragmentary view illustrating a speed scale on an actuating plunger of the device shown in FIGS. 1 and 2.

The shutter of the present invention is contained in a housing, generally indicated at 10, which is adapted to be secured to the forward portion 11 of a conventional camera by means of a bracket 12 secured to the housing 10 and a thumb screw 13 engageable with the camera to insure a snug fit. The housing 10 is made of a rectangular frame 14 and front and back plates 15 and 16, respectively. The front and back plates are perforated with registering perforations, one of which is shown at 17 in FIG. 1 and these perforations also register with the lens of the camera which is contained within the lens housing shown at 18 in FIG. 2. The registering openings 17 thereby form a shutter aperture which is normally closed by a shuttering disc 20 rotatably mounted in the housing and provided with a pair of openings or slots as shown at 21. The slots are equally spaced with respect to the circumference of the disc and extend radially with respect to the disc a distance sufficient to extend across the full width of the shutter aperture as illustrated. They are disposed eccentrically of the disc to admit light through the aperture intermittently.

In operation of the shutter mechanism to provide a multiple exposure record on film within the camera the disc 20 which is carried for rotation on bearings, one of which is shown at 23 in FIG. 2, is first spring loaded. This is accomplished through a pinion 24 mounted on the same shaft which supports the disc and engageable by a rack 25 which is slidable in a guide 26 fixed inside of the housing. A rod 27 is connected with the rack and extends outwardly of the housing into a spring chamber 28. A depressible plunger 29 surrounds a spring 30 in the chamber and is engageable by an operator's thumb for loading the spring by compressing it and moving the rack 25 forwardly into meshing engagement with the pinion 24. A pawl 32 pivoted as at 33 within the housing engages the rack to prevent its retraction under force of the loaded spring 30. A conventional shutter release cable 34 has its inner slidable element 35 connected with the pawl for releasing it upon depression of a plunger 36 in a well known manner. When the rack 25 is advanced and the disc loaded, and the camera properly oriented toward the event to be recorded, the camera shutter is set at a desired shutter timing and, as motion of the event to be recorded is initiated within range of the camera lens, pawl 32 is released and spring 30 retracts the rack 25 to impart rapid spinning motion to the shuttering disc, and the camera shutter is then opened.

Multiple exposures are made on the camera film as the slots 21 pass the aperture 17 until the camera shutter closes at the end of the time for which it was open. The frequency of exposures may be changed by variable loading of the actuating spring 30 and the plunger 29 may be provided with a scale as shown at 38 in FIG. 3 to indicate the energy which is stored in the spring when the plunger is depressed less than its full limit.

The shutter of the present invention is also adapted for use with cameras which have a built-in light sensor. Such light sensors upon receiving light from the direction of the object to be recorded automatically limit the time of closing of the camera shutter. In the present invention, registering apertures, one of which is shown at 40 in FIG. 1, register with the light sensor aperture of the camera and expose it to light from the event to be recorded each time a slot 21 passes the apertures 40. Consequently the camera shutter will remain open for a time determined by the setting of the light sensor on the camera thereby permitting a number of exposures by slot 21 within the range set by the means for driving the disc.

We claim:
1. The combination with a camera having a lens aperture with a conventional shutter and a light sensor aperture in spaced relation, said light sensor controlling the time said shutter normally stays open; of a multiple exposure shuttering device comprising a single rotatable disc having at least one eccentrically positioned opening, means mounting said disc for rotation, with the path of the opening passing before said apertures in said camera and in a non-rotating position to exclude light from said apertures, means to rotate said disc to admit light to said apertures intermittently and successively through said opening and means to regulate the duration of said rotation, whereby the light sensor will permit the shuttering device to make a number of exposures within the range set by the regulating means of said disc.

2. The combination as in claim 1, wherein the means to rotate said disc includes a variable loaded spring actuated rack and pinion.

References Cited by the Examiner
UNITED STATES PATENTS

| 2,233,006 | 2/1941 | Goldhammer | 95—53 X |
|---|---|---|---|
| 2,429,972 | 11/1947 | Aiken | 95—61 |
| 2,460,163 | 1/1949 | Bowen | 95—36 |
| 3,176,312 | 3/1965 | Reinsch | 95—10 |

JOHN M. HORAN, *Primary Examiner.*